A. J. BAYLEY & H. A. ZASTROW.
PRICE INDICATING SCALE.
APPLICATION FILED APR. 24, 1911.
1,003,418.
Patented Sept. 19, 1911.
3 SHEETS—SHEET 3.
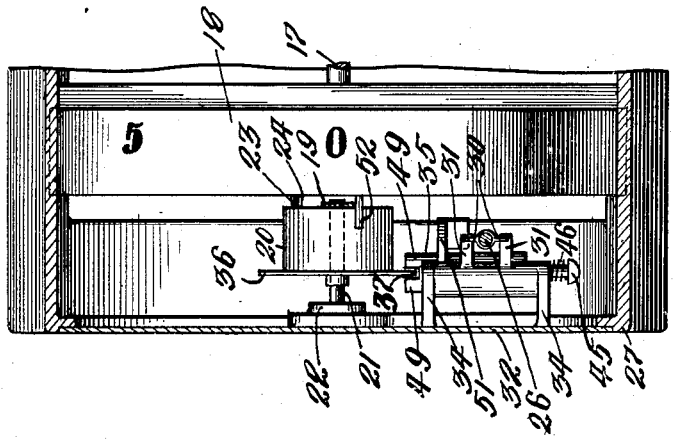
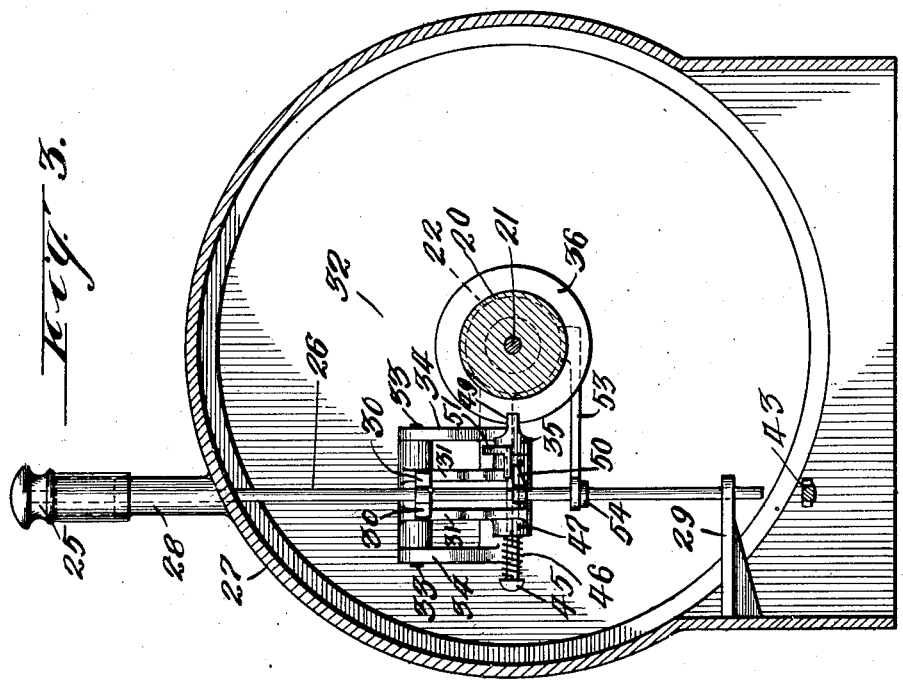

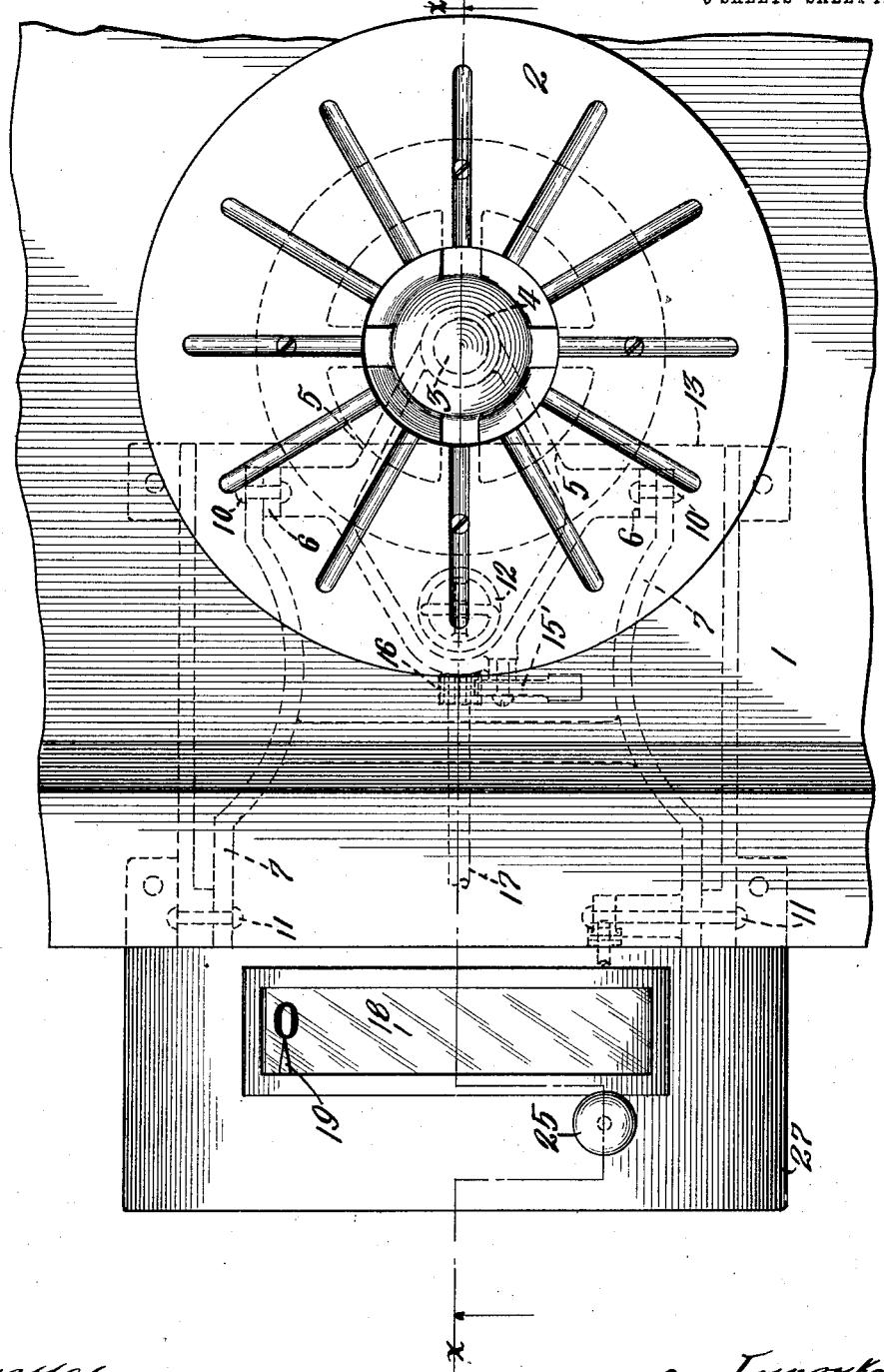

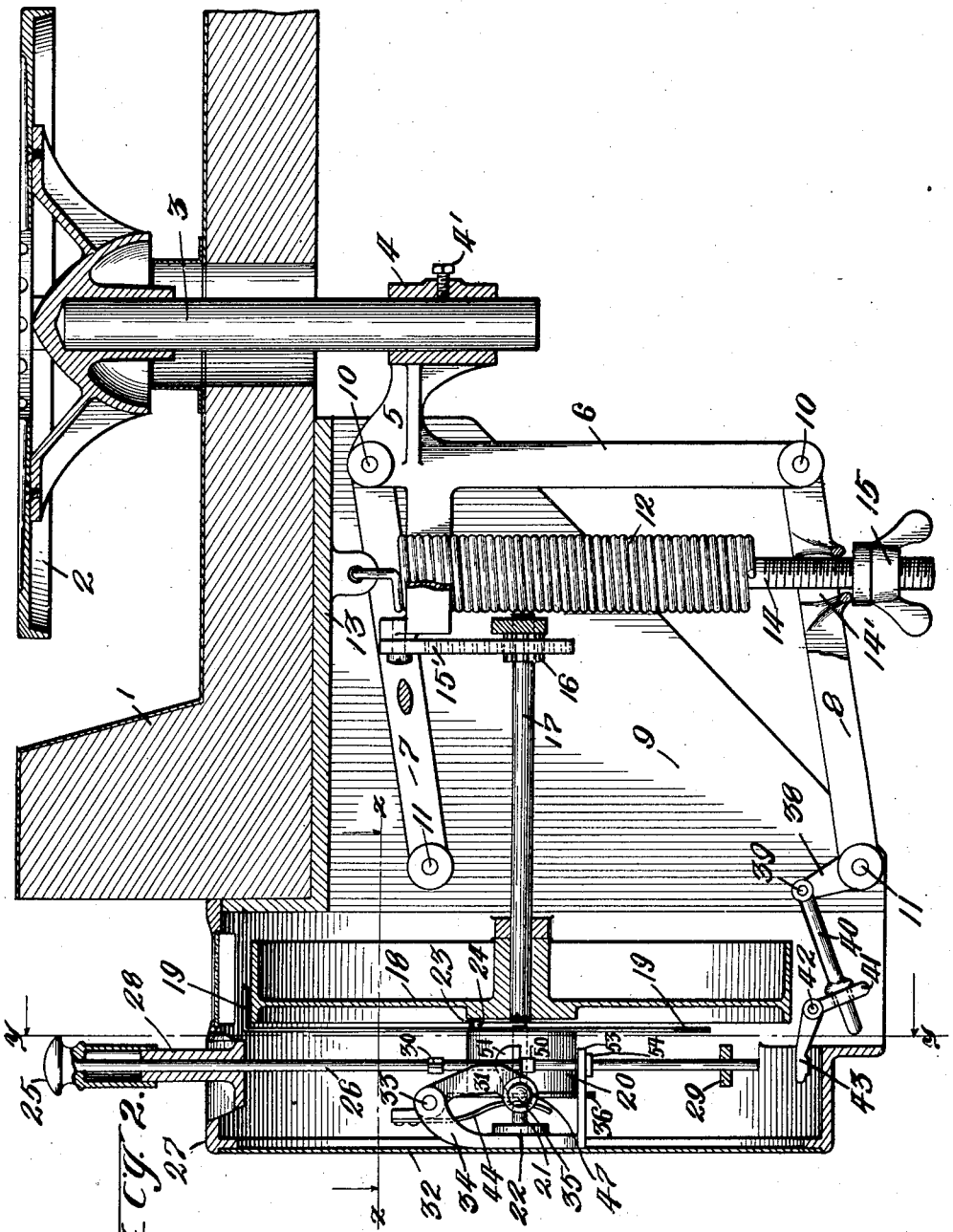

UNITED STATES PATENT OFFICE.

ARTHUR J. BAYLEY AND HENRY A. ZASTROW, OF MILWAUKEE, WISCONSIN.

PRICE-INDICATING SCALE.

1,003,418.  Specification of Letters Patent.  Patented Sept. 19, 1911.

Application filed April 24, 1911.  Serial No. 622,863.

*To all whom it may concern:*

Be it known that we, ARTHUR J. BAYLEY and HENRY A. ZASTROW, citizens of the United States, residing at Milwaukee, county of Milwaukee, and State of Wisconsin, have invented new and useful Improvements in Price-Indicating Scales, of which the following is a specification.

Our invention relates to improvements in that class of scales, which are adapted to indicate the price instead of the weight of a given quantity of goods. For example, the device comprises a dial having one or more price scales provided with a pointer, and said dial is adapted to be moved a greater or less distance past the pointer according to the weight of the goods sold, while the figures or characters on the dial indicated by the pointer after the latter ceases to move, indicate the amount to be paid for any article at a given price. We are aware of the fact that scales for thus indicating the price instead of the weight have previously been made, and invention herein is predicated more especially upon the device for simultaneously moving the pointer with the dial while balancing the weight of the receptacle in which the goods are sold. It will be understood that heretofore when selling liquids, or similar goods by weight, it has been necessary to first ascertain the weight of the receptacle, in which such goods are sold, and to deduct such weight from the total weight of goods and receptacle, otherwise the purchaser would be required to pay for the receptacle at the rate charged for the goods. By our improvement, however, the pointer remains at zero on the dial and both pointer and dial are adapted to move together until the receptacle has been balanced, as stated, when as soon as the pointer and dial cease to be moved by the weight of the receptacle, a push button is moved, whereby the pointer is disengaged from the dial and the dial is free to move independently of the pointer and will consequently register the additional weight or value of the contents of such receptacle only, whereby the necessity and labor of deducting the weight of the receptacle and computing the cost of its contents as heretofore, is avoided.

Our device is especially adapted to be used to ascertain the value of a given quantity of beer, or other foaming beverage.

It is a well known fact that the foam of certain beverages is such as to overflow a receptacle, while the actual quantity or weight of such liquid would only partially fill such receptacle, and one of the primary objects of our device is to provide means for quickly delivering to the purchaser the actual price value of his purchase, regardless of the foam or bulk of the liquid, and to avoid the usual delay incident to computing the weight where a great variety of receptacles are used for handling the goods.

Our invention is further explained by reference to the accompanying drawings, in which—

Figure 1 represents a plan view thereof. Fig. 2 is a vertical section, drawn on line $x$—$x$ of Fig. 1. Fig. 3 is a sectional view, drawn on line $y$—$y$ of Fig. 2, and Fig. 4 is a sectional view, drawn on line $z$—$z$ of Fig. 2, looking down on said figure, showing a side view of the dial and the mechanism for releasing the pointer from the dial after the weight of the receptacle has been indicated.

Like parts are identified by the same reference numerals throughout the several views.

When used for ascertaining the value of a given quantity of beer, or other beverage, the device is preferably located beneath a bar, as shown at 1 in Fig. 2, when the weighing platform 2 is supported above the bar 1 upon the standard 3. The weighing mechanism comprising the platform 2, standard 3, standard supporting collar 4, bracket 5, vertical standard 6, upper swinging arms 7, lower swinging arms 8, means for pivotally connecting said arms at one end with the standards 6 and at their opposite ends with the stationary member 9 by pivotal bolts 10, 10, and 11, 11, respectively, weighing spring 12 suspended at its upper end from the horizontal member 13 and connected at its lower end with the vertical rod 14, which rod extends through the aperture 14′ of the arm 8 and is provided at the extreme lower end with a hand nut 15, toothed bar 15′, pinion 16, and pinion supporting shaft 17, are all constructed and arranged substantially as shown in the ordinary platform weighing scales, and invention herein is predicated, as previously stated, more especially upon the mechanism for moving the dial and pointer both together and independently of each other.

18 represents a dial, which is supported upon and adapted to revolve with the shaft 17.

19 represents a pointer which is adapted to be revolved with the dial when ascertaining the weight of the receptacle, but is adapted to be manually disconnected from the dial after the receptacle has been balanced, and said pointer thereafter remains at rest, as stated, while the dial revolves past it until the receptacle with its contents is balanced by the resistance of the spring, and thereby brought to rest when the pointer will indicate the value of the contents of such receptacle, regardless of its weight. The pointer 19 is supported from a spool 20, and the spool 20 is revolubly supported by the shaft 21. The shaft 21 is rigidly fixed at one end to the frame member 22, while its opposite end terminates opposite the end of said revoluble shaft 17. The dial 18 is provided with a lug 23, which is adapted to contact with the lug 24 on the spool 20, when said spool is thrown rearwardly in the position indicated in Figs. 2 and 4, whereby the pointer 19, which is carried by the spool, is caused to move with the dial, as stated. When, however, the spool 20 is thrown forwardly, the lug 24 is brought out of contact with the lug 23 and the pin 52 out of contact with the pointer 19, whereby the dial 18 is free to move independently of the spool and pointer, and whereby the weight of the contents of the receptacle is determined, as stated. It will be understood that the spool 20 is slidably supported from the shaft 21, whereby it is free to be thrown toward and from the dial. The forward movement is manually communicated to said spool 20 from the push button 25 and the backward movement by the action of the spring 44 after the push rod 26 has been automatically released by the action of the scale mechanism. The push button 25 is rigidly connected to the upper end of the vertical moving rod 26, and said rod 26 is supported at its upper end from the frame 27 in the sleeve 28, and at its lower end in the bracket 29, which bracket 29 is in turn supported at one end from the inclosing frame 27. The rod 26 is provided with two laterally projecting lugs 30, which as said push button 25 is forced down, are adapted to contact with the swinging arms 31, 31. The upper ends of said arms are pivotally connected with the front wall 32 of the inclosing frame by the pivotal bolt 33, and brackets 34, while the lower ends of said arms 31 are connected with the spool 20 through the bolt 35 and disk 36. The bolt 35 is provided with a longitudinal slot 37, which is adapted to engage upon the opposite sides of said disk 36, as more clearly shown in Figs. 3 and 4, whereby as said arms 31 are moved toward the left by the downward pressure upon the push button 25, said disk, together with the spool 20, will be moved forwardly or away from and out of contact with said dial, whereby the pointer 19 will remain at rest until said push button is thrown back to its normal position.

For convenience in operating the device, we have provided means for automatically raising the push button as the receptacle is removed from the platform 2. It will be understood that as the receptacle is removed from said platform, the platform and other coöperating parts will be drawn up by the recoil of the spiral spring 12, whereby one end of the arms 8 will be thrown upwardly and whereby the lower shaft 11 will be turned a partial revolution, when motion will be communicated therefrom to the push button 25 through the arm 38, pivotal bolt 39, link 40, arm 41, pivotal bolt 42, and arm 43, which arm 43 is adapted to contact with the lower end of the rod 26, whereby said rod and push button 25 are raised and the lugs 30 carried by said rod 26 are brought out of contact with the swinging arms 31, when said swinging arms 31 are thrown toward the right by the recoil of the plate spring 44, when motion is communicated from said arms 31 through the bolt 35 and disk 36 to said spool 20, when said spool 20 is thrown toward the dial 18 in position to be again actuated by the revolving movement of said dial.

To prevent the pointer from being accidentally turned and to retain the same at a fixed point as the dial is being moved independently of the pointer, we have provided means for applying friction to the disk 36, whereby said disk 36, spool 20 and the pointer, which is carried by the spool, will be retained in place, while the push button is down. As a means of thus applying friction to the disk, we have connected the slotted bolt 35 with a bolt 45, and said bolt 45 is connected with a spring 46, one end of said spring being connected to the bolt 45 and the other end to the inclosing journal 47. The tension of the spring 46 is such as to cause said bolt 35 to turn a partial revolution, whereby the disk 36 is cramped between the respective lugs 49 of said bolt. When, however, said push button 25 is raised, said bolt 35 is revolved a partial revolution, whereby the lugs 49 are brought out of impinging contact with said disk 36, when said disk is free to revolve through the space between said lugs 49. It will be understood that motion is communicated from the push button 25 to said bolt 35 through said rod 26, projecting lug 50 carried by said rod, and lugs 51 carried by said bolt 35, whereby said bolt will be turned a partial revolution, as stated, and the disk released from the clamping action of said lugs, when the spool and pointer will be free to revolve with the dial.

To return the dial and pointer to zero, we have provided a pin 52 which is attached to the dial near its center, as more clearly shown in Fig. 4, such pin being of sufficient length to allow contact with the edge of the pointer 19 when spool 20 is moved backwardly by the spring 44 acting against the swinging arms 31. It will be understood that when the spool 20 is thrown back to the limit of its rearward movement, the lever 23 connected with said spool is adapted to engage the lug 24 connected with said dial and that the pointer 19, carried by said spool, is adapted to contact with the pin 52 carried by said dial, whereby, when the weight is removed from the scales, both the dial and pointer will be simultaneously returned to the zero point.

53 is an arm for limiting the upward movement of the rod 26. One end of said arm 53 is rigidly connected with the dial inclosing case, while its opposite end is provided with an aperture for the reception of said rod and said rod is provided with a stop collar 54, which is rigidly affixed thereto and is adapted, as said rod is raised, to contact with the lower side of said arm 53, and thereby limit the upward movement of said rod and push button.

To provide for adjusting the platform 2 on a higher or lower plane, relative to its supporting collar 4, we provide said collar with a set screw 4', which when released, permits the standard 3, together with the platform thereon, to be raised, lowered and adjusted, to correspond with the height of the bar from which said platform is supported, and when thus adjusted, the set screw 4' is turned inwardly so as to impinge against said standard 3, whereby the platform is retained in place.

It will be understood that when the platform 2 is thrown up by the recoil of the spring 12, motion is simultaneously communicated from said spring to the push rod 26, through the intervening mechanism previously described, whereby the spool 20 is pushed rearwardly to the position shown in Fig. 4, in which position, the pointer 19 is brought in line of the circle described by the pin 52 which is carried by the dial, and whereby the pointer is brought back simultaneously with the movement of the dial, to its normal starting point, preparatory to being acted upon as the next weighing operation occurs.

Having thus described our invention, what we claim as new, and desire to secure by Letters Patent, is—

1. In a weighing scale of the described class, the combination of a revoluble index dial, an index pointer, means for connecting said pointer with said dial, whereby said dial and pointer are adapted to revolve together when balancing the weight of a receptacle, and means for manually releasing said index pointer from said dial after the weight of the receptacle has been balanced.

2. In a weighing scale of the described class, the combination of a revoluble index dial, an index pointer, means actuated by the movement of the weighing spring for automatically connecting said pointer with said dial whereby said dial and pointer are adapted to revolve together when balancing the weight of a receptacle, and means for manually disengaging said pointer from said dial after the weight of the receptacle has been balanced.

3. In a weighing scale of the described class, the combination of a revoluble index dial provided with an annular series of price indicating characters, an index pointer, means for connecting said pointer with said dial, whereby said dial and pointer are adapted to revolve together when balancing the weight of a receptacle, and means for manually releasing said index pointer from said dial after the weight of the receptacle has been balanced.

4. In a weighing scale of the described class, the combination of a revoluble index dial, an index pointer, means for automatically connecting said pointer with said dial, whereby said dial and pointer are adapted to revolve together when balancing the weight of a receptacle, means for holding said index pointer in a fixed position after the dial has been disengaged therefrom, and means for manually releasing said index pointer from said dial after the weight of the receptacle has been balanced.

5. In a weighing scale of the described class, the combination of a revoluble index dial provided with an annular series of price indicating characters, an index pointer, a push button, means actuated by said push button for disconnecting said pointer from said dial, whereby said dial is free to revolve independently of said pointer, means for holding said index pointer in a fixed position after the dial has been disengaged therefrom, and means actuated by the movement of the weighing spring for automatically engaging said pointer with said dial.

In testimony whereof we affix our signatures in the presence of two witnesses.

ARTHUR J. BAYLEY.
HENRY A. ZASTROW.

Witnesses:
JAS. B. ERWIN,
IRMA D. BREMER.